United States Patent [19]
Dronen et al.

[11] Patent Number: 5,454,585
[45] Date of Patent: Oct. 3, 1995

[54] STRUT ASSEMBLY WITH BEARING AXIS ALIGNMENT

[75] Inventors: Gregory D. Dronen, Centerville; Richard A. Hellyer, Huber Heights, both of Ohio

[73] Assignee: General Motors Corporation, Detroit, Mich.

[21] Appl. No.: 287,317

[22] Filed: Aug. 8, 1994

[51] Int. Cl.⁶ ................................................ B60G 3/00
[52] U.S. Cl. ........................ 280/660; 280/668; 267/220
[58] Field of Search .................... 280/660, 668, 280/688, 691; 267/220; 188/321.11

[56] References Cited

U.S. PATENT DOCUMENTS

| Re. 31,184 | 3/1983 | Lederman | 280/668 |
|---|---|---|---|
| 4,195,862 | 4/1980 | Specktor et al. | 280/661 |
| 4,690,425 | 12/1987 | Kubo | 280/668 |
| 4,771,996 | 9/1988 | Martinez et al. | 267/220 |
| 5,074,579 | 12/1991 | Evangelisti | 267/220 |
| 5,338,055 | 8/1994 | Maaz | 280/668 |

FOREIGN PATENT DOCUMENTS

| 0187970 | 7/1986 | European Pat. Off. | 280/668 |
|---|---|---|---|
| 2605941 | 5/1988 | France | 280/668 |
| 2625950 | 7/1989 | France | 280/668 |
| 4211176 | 10/1993 | Germany | 267/179 |
| 8905242 | 6/1989 | WIPO | 267/220 |

*Primary Examiner*—Richard M. Camby
*Assistant Examiner*—Paul N. Dickson
*Attorney, Agent, or Firm*—Anthony Luke Simon

[57] ABSTRACT

A quarter car vehicle suspension including a wheel, a bearing having an axis of rotation, a quarter car steer axis about which the wheel steers, a strut with a piston rod and a piston rod axis, the piston rod axis aligned at an acute angle with respect to the quarter car steer axis, and a spring seat, wherein the bearing is mounted between the spring seat and the vehicle body, and wherein the axis or rotation of the bearing is substantially aligned with the quarter car steer axis and at an acute angle to the piston rod axis.

2 Claims, 4 Drawing Sheets

STRUT ASSEMBLY WITH BEARING AXIS ALIGNMENT

This invention is related to the subject of copending U.S. patent application, Ser. No. 08/287,035, filed concurrently with this invention and assigned to the assignee of this invention. This invention relates to the mounting of a strut assembly in a steerable suspension to a motor vehicle body.

BACKGROUND OF THE INVENTION

It is known in motor vehicle suspension systems such as McPherson strut or other strut-type suspensions that side load forces on the strut can increase strut friction. Techniques for side load compensation such as seating the spring on an angle relative to the strut axis and pointing the bottom of the strut slightly outward from vertical have reduced side load friction from the strut.

FIG. 1 illustrates a prior art front suspension system assembly 10 including a strut and spring. The vehicle body includes a shock tower 12 comprising sheet metal of the vehicle within which is mounted a top mount assembly 14 through which the strut and spring are attached to the vehicle. The top mount assembly 14 comprises integrally molded rubber body 18 and rigid body members 22 and 24, typically made of stamped steel. Top mount assembly 14 is mounted to the body strut tower 12 by bolts 16 integrated into top mount assembly 14 placed through bolt holes in the strut tower 12. The top mount assembly 14 carries a bearing assembly 28 of a known type that is friction fit around the outside of the rubber 18 of the top mount assembly 14 and seats in top mount assembly 14 so that one side of bearing assembly is fixed relative to the top mount assembly and the strut tower. The second side of bearing assembly 28 freely rotates with respect to the first side of the bearing assembly, the top mount assembly and the strut tower.

The free rotating side of the bearing assembly 28 carries a composite spring seat 30 that is clearance fit to the outer diameter of the free rotating side of bearing assembly 28. The rubber isolator 32 sits within the spring seat 30 in between the spring 40 and the composite spring seat 30. Isolator 32 acts to prevent high frequency suspension noise in spring 40 from transferring to the spring seat 30 and the vehicle body. Jounce cup 34 is press fit within the inner diameter of rigid member 24 of the top mount assembly. Jounce bumper 36, comprising an elastomeric material such as urethane, and the plastic dust cover 38, are snapped within jounce cup 34 as shown. Affixed to the damper cylinder 48 in a known manner is the lower spring seat 42 including an isolator 44, made of an elastomeric material such as rubber, within which the spring 40 seats.

During assembly of the piston rod 46 to the top mount assembly 14, the spring 40 is compressed by a manufacturing aid of a known type until the end of piston rod 46 fits through opening 43 in the mount assembly. Next rate washer 11 and nut 13 are attached to the end of the piston rod 46 thereby holding the rod to the top mount assembly 14. The manufacturing aid then releases the spring, which forces piston rod 46 to its outer most position with respect to damper cylinder 48 and affects the fit of spring seat 30 to the outer diameter of the free rotating portion of bearing assembly 28.

On the lower end of damper cylinder 48 is attached mounting bracket 50 of a known type, which is affixed with bolts to knuckle 52 of wheel assembly 58. As shown in the Figure, the piston rod axis 60 is substantially coaxial with the axis of bearing assembly 28. Both the piston rod axis 60 and the axis of bearing assembly 28 are at an acute angle, for example, approximately 8°, to the quarter car steer axis 54, also referred to as the king pin axis, running between the center of the bearing assembly 28 and the center of the stud 56 of the wheel lower ball joint. An outline of the tire 55 is shown with respect to the suspension unit. As can be seen, the lower end of piston rod axis 60 is mounted at an outward vertical angle with respect to the true vertical axis 61.

SUMMARY OF THE PRESENT INVENTION

Advantageously, this invention provides a strut mounting assembly that allows for a side load compensation to reduce strut friction while also providing reduced steering friction.

Advantageously, this invention provides a strut assembly for a steerable suspension that reduces the level of steering friction felt and improves an on-center feel of the steering system by minimizing memory steer, which is defined as a tendency of the steering system to pull in the direction of the last off center steer. Further, this invention advantageously improves the on-center feel of the steering system by improving the steering return-to-center/straight ahead setting tendency.

Advantageously, this invention reduces side loading of the steering bearing in an upper strut mount. This invention achieves the reduced steering friction, the reduction in memory steer, the reduced side loading of the strut upper bearing by an advantageous strut mounting assembly that places the axis of the strut mount bearing assembly substantially coaxial with the quarter car steer axis or king pin axis. Advantageously then, the axis of the upper mount bearing assembly is at an acute angle to the axis of the piston rod of the suspension strut.

Advantageously the structure of this invention is embodied by a quarter car vehicle suspension having a quarter car steer axis or king pin axis, a strut including a piston rod having a strut axis wherein the strut axis is at an acute angle to the quarter car steer axis or king pin axis, a mount assembly affixed to the piston rod and to the vehicle body, a spring seated in a lower spring seat affixed to the strut cylinder and an upper spring seat seated on a bearing assembly, and a carrier of the bearing assembly affixed with respect to the top mount assembly having a carrying surface substantially perpendicular to the quarter car steer axis wherein the bearing assembly is seated on the carrying surface to thereby substantially align the axis of the bearing assembly with the quarter car steer axis or king pin axis thereby providing an acute angle between the piston rod axis and the bearing assembly axis.

A more detailed description of this invention is set forth below.

DETAILED DESCRIPTION OF THE INVENTION

Figure 1:
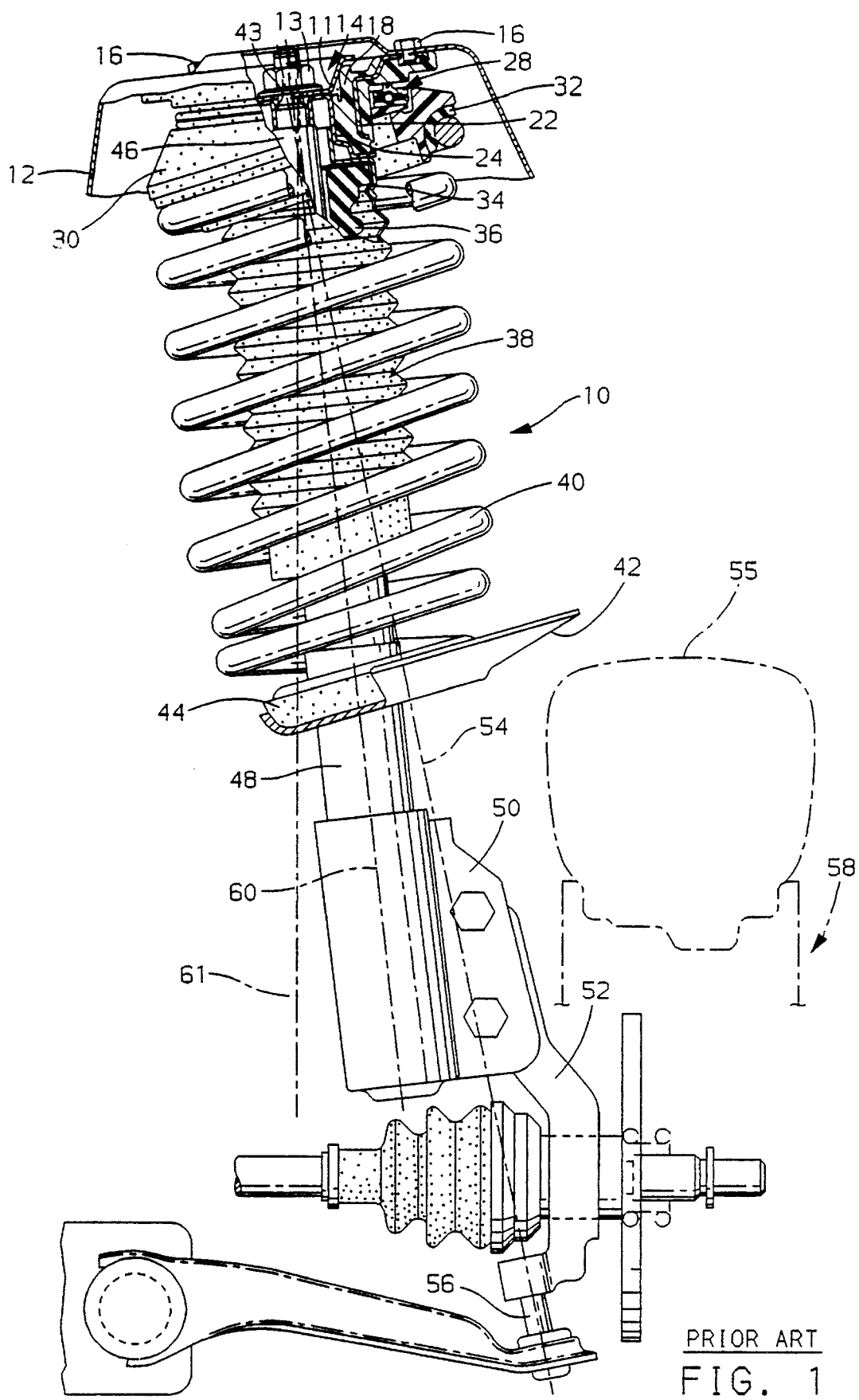
FIG. 1 illustrates a prior art suspension system.
Figure 2:
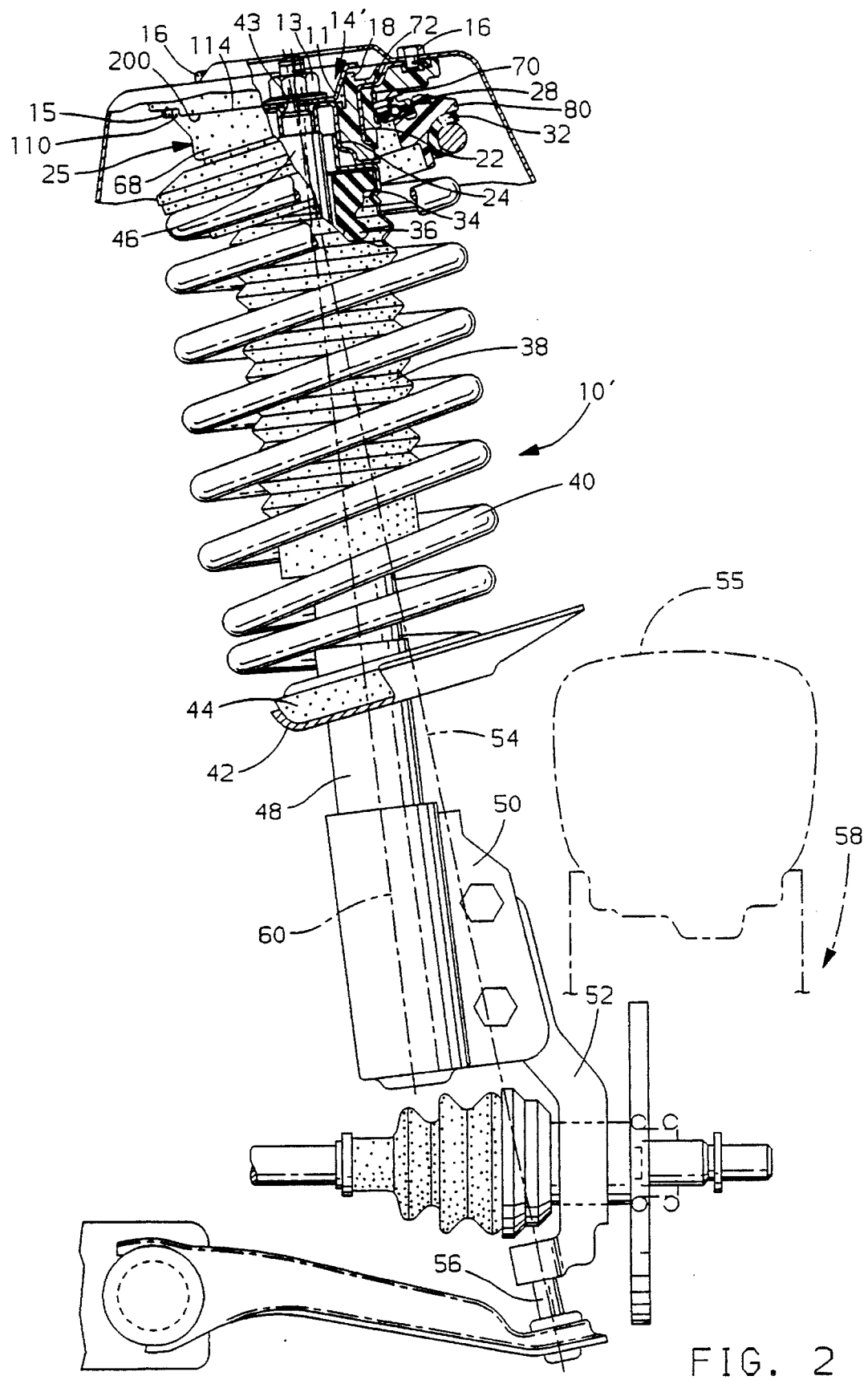
FIGS. 2, 3 and 4 illustrate a suspension system according to this invention.
Figure 3:
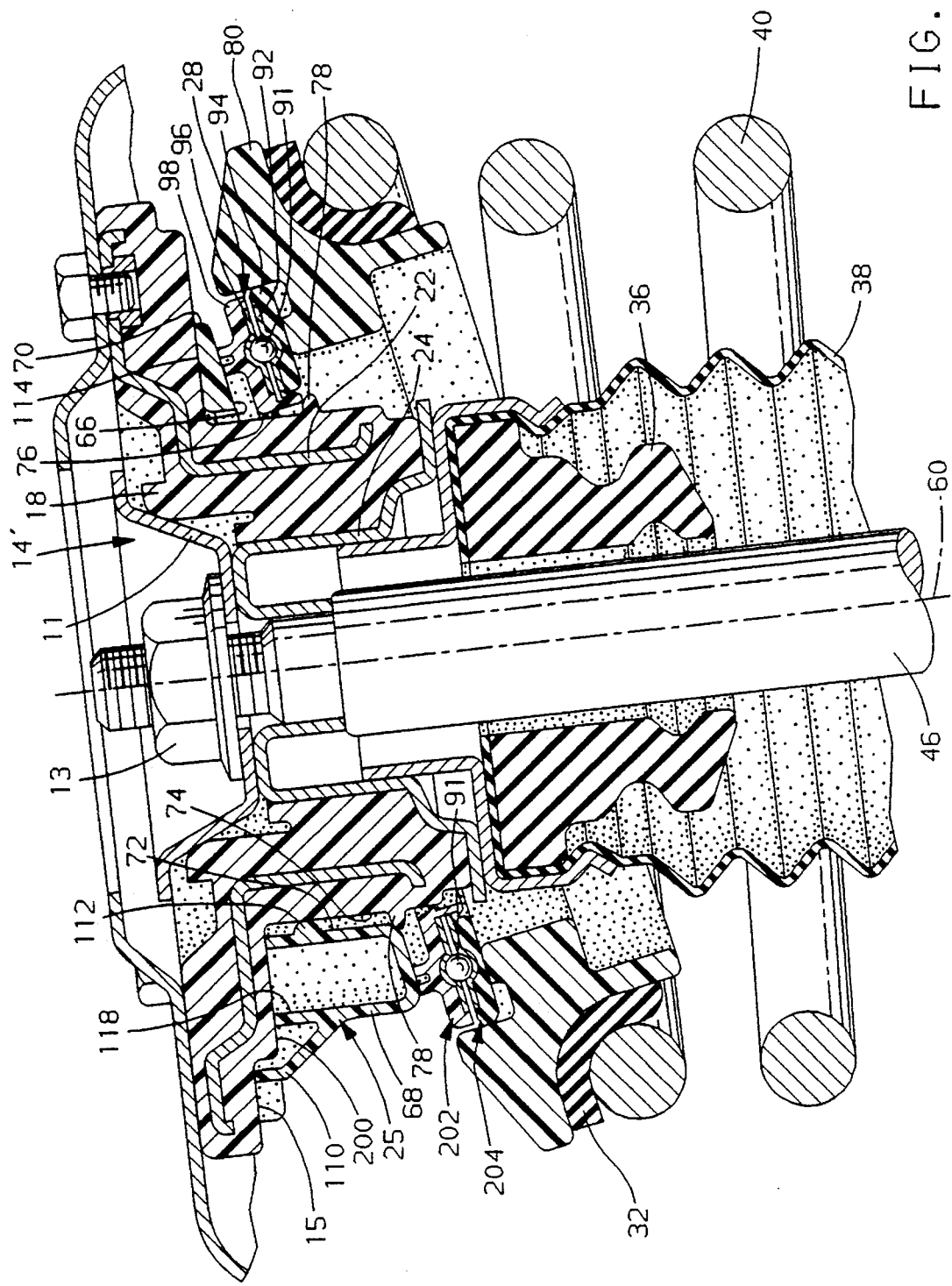

Referring now to FIG. 2 and 3, the suspension assembly 10' shown includes many components similar to those shown in FIG. 1 and identified so with like reference numerals. The top mount assembly 14' is similar to the top mount assembly 14 shown in FIG. 1 and includes the rubber body 18 and rigid members 22 and 24 as shown and also includes the recess 15, the purpose of which is explained below.

Surface 200 of the top mount assembly 14', instead of seating the bearing assembly 28, as shown in FIG. 1, seats a circular wedge 25 as shown. The wedge 25 has a wedge profile provided by an axially wide end 68 and an axially narrow end 70. The wedge 25 has a mount seat 114 that seats against the mount surface 200, and, at an angle thereto, a bearing seat 66 that carries one side of the bearing assembly 28. An extending arm 110 extends radially outward and axially into recess 15 of the top mount assembly 14' to act as a locator. If the wedge 25 is not aligned properly, the arm 110 will not meet the recess 15 and the wedge will not be completely seated against seat 200 of the top mount assembly 14'. The wedge 25 may be provided with an inner diameter 72 sized to fit over retention tabs 78 on the outer diameter 74 of the rubber body 18 of top mount assembly 14'. Through the use of the rubber tabs 78, the wedge 25 can be assembled to the top mount assembly 14' and the two parts shipped as an assembly. Also, the bearing assembly 28 has an inner diameter 76 that is held on by rubber tabs 78 to the outer diameter 74 of the rubber body 18 of the top mount assembly 14', allowing bearing assembly 28 to be snap fit into top mount assembly 14' and remain affixed thereto through so the bearing assembly may also be transported as pan of an assembly together with the wedge 25 and top mount assembly 14'.

First side 202 of the bearing assembly 28 is fit to the top mount assembly 14' and thereby remains stationary with respect to the wedge 25, top mount assembly 14' and the vehicle body. The second side 204 of the bearing assembly is allowed to rotate, via the bearing, freely with respect to the stationary side 202. Spring seat 80 is mounted to the free rotating portion 204 of the bearing assembly 28 through a clearance fit in a similar manner as described above with respect to spring seat 30 of FIG. 1.

Including the wedge 25 with the top mount assembly 14' places the bearing assembly 28 so that its axis of rotation is no longer aligned with axis 60 of piston rod 46 and is at an acute angle with respect to the axis 60 of the piston rod 46. Use of the wedge 25 of proper angle places the axis of bearing assembly 28 substantially coaxial with the quarter car steer axis (or kingpin axis) 54 of the steering system. Thus, when steering of the wheel attached to the suspension shown occurs, the bearing assembly 28 rotates its freely rotating portion 204 on or substantially on the steering axis, instead of forcing the bearing 28 to rotate at an axis at an angle to the steering axis as shown in FIG. 1. By aligning the axis of the bearing 28 to the steer axis, steering friction on the bearing assembly 28 is reduced due to the virtual elimination of forces transverse the bearing axis during steering. Also achieved by placing the bearing axis substantially equal to the steering axis, an operator driving and steering a vehicle by a wheel attached to the suspension 10' shown feels less steering friction. Further it has been shown that the above arrangement reduces memory steer, which is a tendency of a vehicle to pull to the direction in which a steering sequence was most recently performed.

Figure 4:
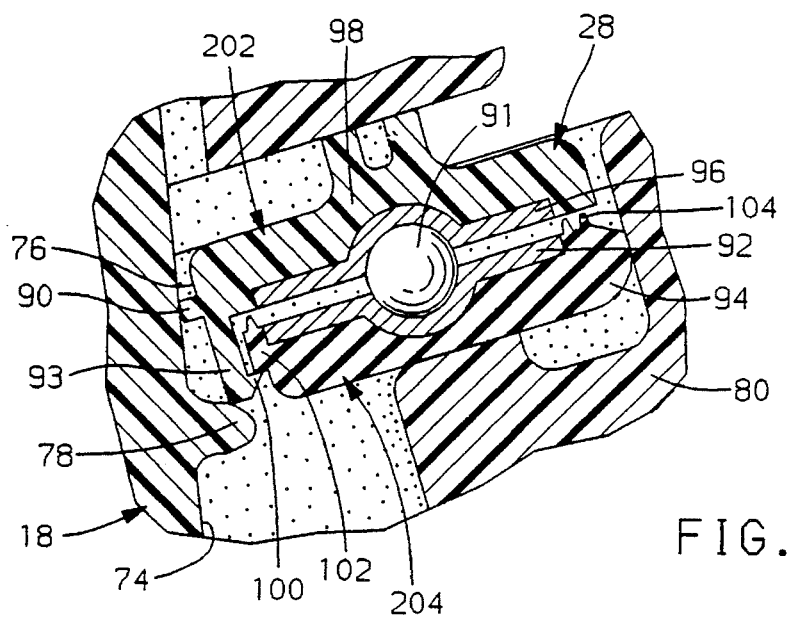

Referring now also to FIG. 4, bearing assembly 28 may include, on an inner diameter, numerous protrusions 90 to aid with the centering between the bearing and the upper mount assembly 14'. The bearing 28 has two rigid metal members 92 and 96, each having an annular shape, as shown, forming the race for the ball bearings 91. Rubber body 94 is integrally molded onto one of the metal members 92 as shown and includes an annular rubber lip 102 radially inward of the rubber body 94 and annular wipers 104, both radially inward and radially exterior the ball bearings 91 to provide dust protection to the bearings 91. Integrally molded with metal 96 is plastic body 98 forming an annular ring and including a radially inward axial extension 93 that extends over the annular lip 102 of the rubber body 94. Extension 93 includes a snap feature 100 that engages the rubber lip 102 and retains the bearing assembly 28 assembled while also allowing rotation between the rubber body 94 and plastic body 98.

Figure 5:
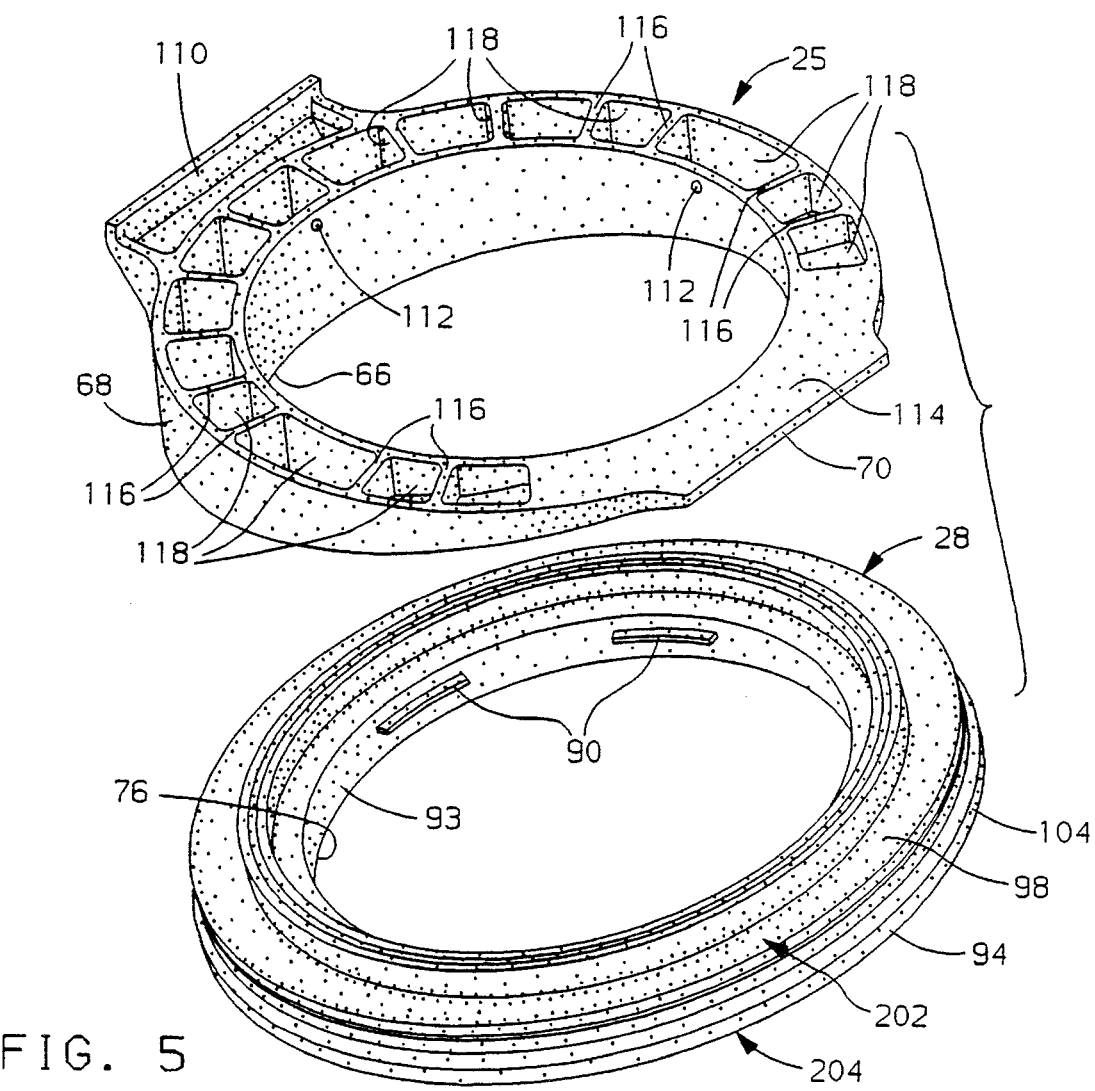
FIG. 5 illustrates a view of the wedge and bearing shown in FIGS. 2, 3 and 4.

Referring now also to FIG. 5, the wedge generally comprises an annular body having a wedge profile. On the inner diameter of the wedge are four features 112, such as dimples, which protrude radially inward and aid in establishing the centering between the wedge 25 and the top mount assembly 14'. The wedge may be constructed from various materials and a preferred example includes 25% glass fiber filled nylon 6/6. To save weight, the thicker portions of the wedge form hollow recesses 118 with axially and radially extending ribs or walls 116 between the recesses 118. This structure has been found to provide sufficient strength and flatness while minimizing the cost and weight of the wedge. In an example implementation, use of this structure has limited the weight of wedge 25 to 28 grams.

Since the bearing illustrated has its seat surfaces in a plane perpendicular to the axis of rotation of the bearing, and, in the example shown, the seat surface 200 of the top mount assembly is substantially perpendicular to the strut rod axis, the acute angle formed between the axis of rotation of the bearing and the strut rod axis is equal to the wedge angle between the two seat surfaces of wedge 25.

While the above-described embodiment of this invention describes the axis of rotation of the bearing assembly substantially coaxial with the steer angle or king pin axis, in actual implementation, the axis of rotation of the bearing assembly may be off slightly from the steer angle axis. Such slight deviation from the preferred placement may sometimes be inescapable due to design constraints and/or part tolerances and those skilled in the art will appreciate that such implementations fall within the scope of this invention. Example accuracy of the bearing axis to the steering axis is 1–2'.

Those skilled in the art will appreciate that the invention herein is embodied in a method of assembling a quarter car suspension system comprising the steps of: seating an annular wedge to a top mount assembly, seating a bearing with an axis of rotation to a top mount assembly by seating the bearing to a first surface of the wedge having an acute angle to a second surface of the wedge seated against the top mount assembly, seating a spring seat to the bearing, and mounting a piston rod having a piston rod axis perpendicularly to a top mount assembly, wherein the axis of rotation of the bearing is at an acute angle to the piston rod axis and is substantially aligned with a quarter car steer axis of the suspension system.

Moreover, various other improvements and modifications to this invention may occur to those skilled in the art and such improvements and modifications will fall within the scope of this invention as set forth below.

The embodiments in which an exclusive property or privilege is claimed are defined as follows:

1. A quarter car vehicle suspension having a quarter car steer axis or king pin axis, comprising:

a strut including a cylinder and a piston rod having a strut axis, wherein the strut axis is at an acute angle to the quarter car steer axis or king pin axis;

a top mount assembly seated in a seat of a shock tower of a vehicle body, the top mount assembly having a central opening affixed to the piston rod, wherein the seat of the shock tower is substantially perpendicular to the strut axis;

a spring seated in a lower spring seat affixed to the strut cylinder and an upper spring seat seated on a bearing assembly, wherein the upper spring seat has an annular shape, wherein the bearing assembly has an annular shape, and wherein a portion of the piston rod is located substantially centrally within the bearing assembly and the upper spring seat, and wherein the strut axis intersects the steer axis substantially centrally within the bearing; and a carrier of the bearing assembly affixed with respect to the top mount assembly having a carrying surface substantially perpendicular to the quarter car steer axis wherein the bearing assembly is seated on the carrying surface, wherein the carrier substantially aligns the axis of the bearing assembly with the quarter car steer axis or king pin axis thereby providing an acute angle between the piston rod axis and the bearing assembly axis, wherein, the mount assembly comprises an annular body defining a recess at a select location in the annular body;

the carrier comprises an arm extending radially outward of the bearing assembly and into the recess when the carrier is properly aligned.

2. A quarter car vehicle suspension having a quarter car steer axis or king pin axis comprising:

a strut including a cylinder and a piston rod having a strut axis, wherein the strut axis is at an acute angle to the quarter car steer axis or king pin axis;

a top mount assembly seated in a seat of a shock tower of a vehicle body, the top mount assembly having a central opening affixed to the piston rod, wherein the seat of the shock tower is substantially perpendicular to the strut axis;

a spring seated in a lower spring seat affixed to the strut cylinder and an upper spring seat seated on a bearing assembly, wherein the upper spring seat has an annular shape, wherein the bearing assembly has an annular shape, and wherein a portion of the piston rod is located substantially centrally within the bearing assembly and the upper spring seat, and wherein the strut axis intersects the steer axis substantially centrally within the bearing; and a carrier of the bearing assembly affixed with respect to the top mount assembly having a carrying surface substantially perpendicular to the quarter car steer axis wherein the bearing assembly is seated on the carrying surface, wherein the carrier substantially aligns the axis of the bearing assembly with the quarter car steer axis or king pin axis thereby providing an acute angle between the piston rod axis and the bearing assembly axis, wherein the carrier comprises an annular wedge including a first surface seated against the mount assembly and a second surface to which the bearing is seated, the second surface forming an angle equal to the acute angle, wherein the wedge includes a wide end and a narrow end, wherein the wide end includes a series of hollow chambers with axially and radially extending walls therebetween.

* * * * *